Oct. 29, 1968 R. D. GIBBS 3,407,472
APPARATUS FOR DEVELOPING ELECTRICAL COILS IN INDUCTIVE DEVICES
Filed July 28, 1966 3 Sheets-Sheet 1

Inventor:
Richard D. Gibbs,
by John M. Stoudt
Attorney.

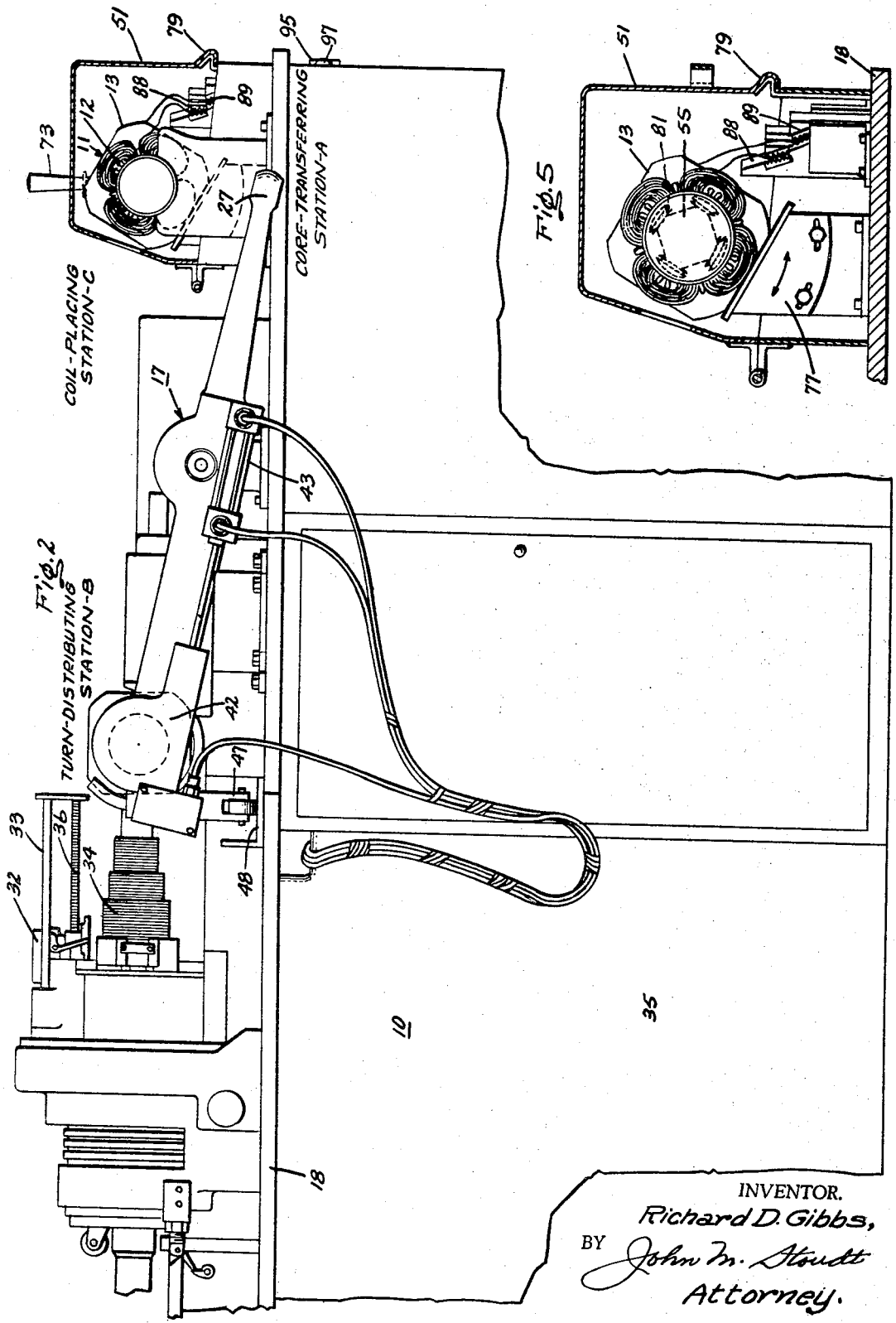

Oct. 29, 1968 R. D. GIBBS 3,407,472
APPARATUS FOR DEVELOPING ELECTRICAL COILS IN INDUCTIVE DEVICES
Filed July 28, 1966 3 Sheets-Sheet 3
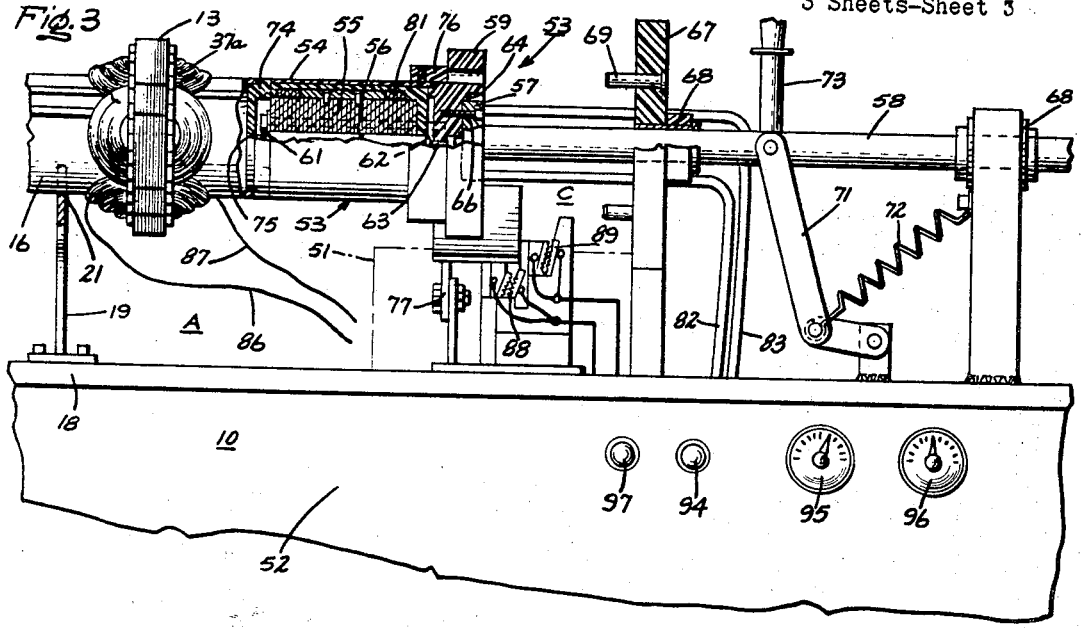
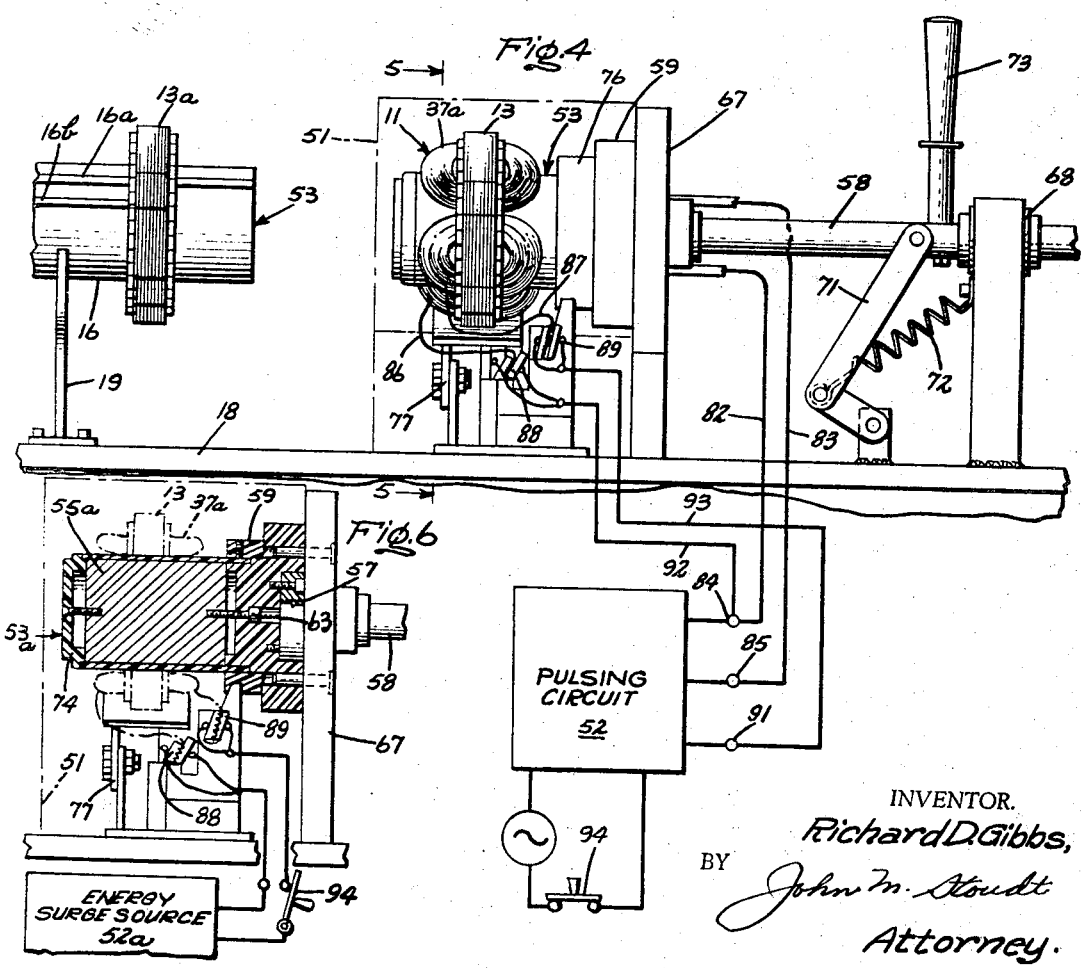
INVENTOR.
Richard D. Gibbs,
BY
John M. Stoudt
Attorney.

United States Patent Office 3,407,472
Patented Oct. 29, 1968

3,407,472
APPARATUS FOR DEVELOPING ELECTRICAL
COILS IN INDUCTIVE DEVICES
Richard D. Gibbs, Malta, Ill., assignor to General Electric
Company, a corporation of New York
Filed July 28, 1966, Ser. No. 568,593
12 Claims. (Cl. 29—205)

Background of the invention

The present invention relates to an improved apparatus for developing electrical coils in inductive devices, and more particularly to an improved apparatus especially suitable for developing a number of conductor turns into electrical coils carried by magnetic cores during the manufacture of such members as dynamoelectric machine stator and armature cores.

During the fabrication and assembly of electrical inductive devices, it is generally necessary to develop one or more coils from a number of individual, serially joined, conductor turns having a coating of insulation and to press these insulated turns back in coil accommodating slots of magnetic cores normally utilized in such devices. By way of illustration, in the manufacture of stator members having at least two separate windings employed in dynamoelectric machines, it was customary to distribute coil side portions of one winding in the slots of a stator core at a first winding operation. The winding equipment disclosed in the Mason Patent 2,836,204 is one of the more desirable winding machines in use today for accomplishing this operation. Thereafter, at least end turn portions, which project beyond the end faces of the core of the one winding, are pressed back away from the rotor receiving bore of the stator at a so-called "in-between press" operation located at a remote location from the winding operation. Until recently, the in-between press operation involved the use of mechanical equipment which made physical contact with the outer surfaces of the coil portions to produce a pressure engagement of these coil surfaces in order to press at least the coil end turns back away from the bore so that the second winding could be installed at a second winding operation. This equipment was normally operated by semi-skilled personnel.

As a result of certain recent advents, this in-between press back operation is now being accomplished in the production of more and more stators by the utilization of electrical energy rather than by the mechanical pressure contact mentioned above. In some such applications one or more high energy rate pulses or surges are injected directly into the coils or into electrical conductors inductively coupled with the coils. A number of such innovations are disclosed and/or referred to in the William Baldwin pending U.S. application Ser. No. 513,028 filed on Dec. 10, 1965 and assigned to the same assignee as the present invention.

It is therefore extremely desirable that an apparatus for coil development employing electrical energy be economically and efficiently integrated with existing winding machines, such as the Mason machine, at the same general location. It is further desirable that the foregoing be achieved without necessitating complete reconstruction of the winding machine. In addition, such integration should be achieved by a manner which effectively minimizes potential electrical hazards to winding machine operating personnel, which might occassionally occur from flashing when the energy surges are injected into a defective winding. Moreover, it is particularly desirable that the coil development be accomplished as effectively and rapidly as possible, without need for more than one operator.

Summary of the invention

Accordingly, it is a primary object to provide an improved apparatus for developing electrical coils in inductive devices.

It is a more specific object of the present invention to provide an improved apparatus especially suitable for developing a number of turns into the coils carried by magnetic cores economically and efficiently by using turn winding equipment and electrical energy.

It is another object of the present invention to provide an improved apparatus for developing electrical coils in magnetic cores which attains the desirable features mentioned above.

In carrying out the objects in one form, I provide an improved apparatus for developing electrical coils in magnetic cores. By way of illustration, core-conveying means is pivotally mounted to swing a core holder between turn-distributing and core-transferring stations, the conveying means further including an indexing device for intermittently turning and locating the core in the turn-distributing station for proper sequential installation of the turns into the core. For transporting the core from the core-transferring station to the coil placement station, the latter station is furnished with a core carrier which moves between an extended position, where it mates with the holder of the conveying means for receiving the core having coils, and a retracted position located in an enclosure at the coil placement station where it supports the core having coils as the coils are being placed relative to the core.

When the holder having the core with coils is disposed in the retracted position, an electrical coupler links the core and coils to an electrical energy surge source for generating one or more energy surges in the coils to effect the desired coil placement relative to the core. This latter operation may be conveniently carried forth while another core is provided at the turn-distributing station for receiving turns. Thus, coils may be concurrently developed in several cores by the same apparatus, necessitating but a single operator for the complete development of the coils in the several cores.

The coil development is consequently efficiently, economically, and rapidly afforded by my invention which permits the use of existing winding equipment for distributing the turns into the slots without necessitating a complete reconstruction of such equipment. In addition, while electrical energy is utilized to attain part of the coil development and even though it is employed in conjunction with winding equipment, the operator is protected from potential electrical hazards.

Brief description of the drawings

The subject matter which I regard as my invention is set forth in the appended claims. The invention itself, however, together with further objects and advantages thereof, may be better understood by referring to the following description taken in conjunction with the following drawings in which:

FIGURE 2 is a side view of the apparatus of FIGURE 1, revealing the installation of turns into the core at the turn-distributing station as coil force-back to the desired position is concurrently being effected at the coil-placement station;

FIGURE 3 is an end view partially broken away, of part of the apparatus seen in FIGURE 1 to show details of the coil-placement station, with the core carrier being disposed in the extended position for receiving the core having coils from the core conveying holder at the core-transferring station;

FIGURE 4 is a view similar to FIGURE 3 illustrating the carrier in the retracted position at the coil-placement station, with the coils and core supported in that station and being electrically coupled to an energy surge source, schematically shown, for generating an energy surge into the coils to produce electromagnetic forces acting on the coils to effect the desired coil placement;

FIGURE 5 is a view taken along line 5—5 in FIGURE 4 and shows the coils after they have been forced back relative to the core; and FIGURE 6 is a view partially broken away of another form of an electrical coupler which may be utilized to generate a surge of energy in the coils and produce the desired coil placement.

Description of the preferred embodiments

Figure 1:
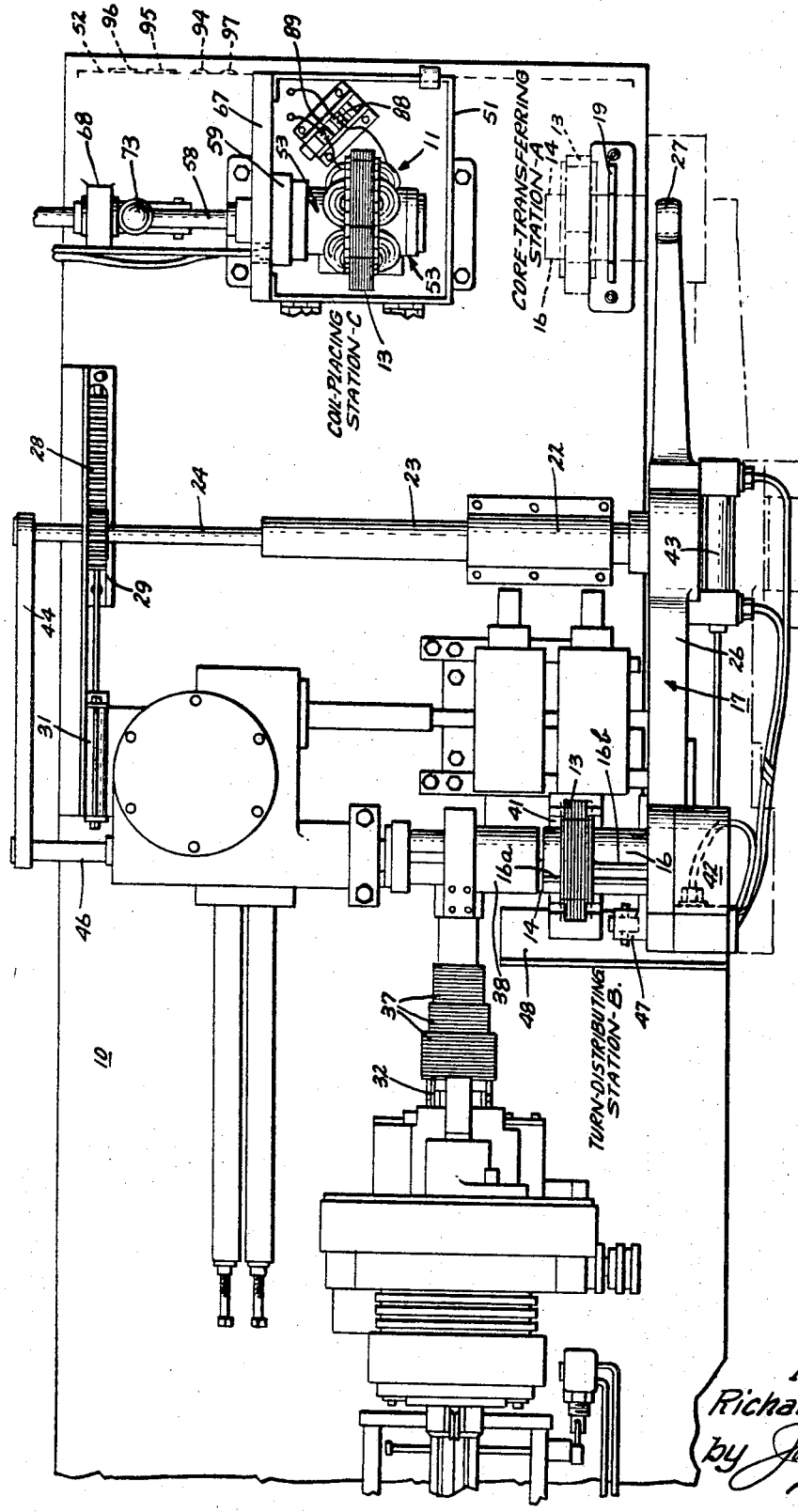
FIGURE 1 is a plan view of an improved apparatus embodying one form of the present invention which may be used to practice the process of developing coils in inductive devices, the view showing the various stations and components for achieving the development in connection with stators by way of exemplification.

Turning now to the drawings in more detail and in particular to FIGURES 1-5 inclusive, there is shown one form of an improved apparatus 10 for developing electrical coils in inductive devices, the apparatus being revealed in connection with the development of main excitation windings 11 carried in the slots 12 of dynamo-electric machine stator cores 13 adapted for use in small and fractional horsepower electric motors (not shown).

In the exemplification, core 13 having suitably insulated slots is slid onto the free end 14 of a tubular shaped holder 16, of a conveyor 17, at a core-transferring station A. The holder is formed with elongated ribs 16a which enter selected core slots locking the core on the holder. Mounted to the upper surface of horizontal table 18 is an upright bracket 19 having a curved edge 21 in complementary engagement with holder 16 which serves to support the holder in the desired position at station A. Conveyor 17 is pivotally supported, as by elongated bearing assembly 22, sleeve 23, and rod 24, for swinging holder 16 between the core-transferring station A and a turn-distributing station B, where the turns are distributed into the slots of the core 13. Rod 24 is connected at one end to an enlarged section of conveyor arm 26, intermediate holder 16 and a suitably counterbalanced end 27 which compensates for the weight and distance of the holder and core from the pivotal axis. Rod 24 extends through sleeve 23 which is itself rotatably supported in elongated bearing assembly 22 mounted to table 18 adjacent arm 26. Any convenient way may be employed to operate conveyor 17 between stations A and B, such as the rack and gear assembly denoted by numeral 28 in FIGURE 1. The rack is slidably received in a guideway 29 and is suitably operated to move in a direction normal to the axis of rod 24 by compressed air through cylinder 31.

Turning now to the turn-distributing station, any suitable means may be employed to disposed turns in the slots of the core at station B. By way of exemplification only, in the illustrated embodiment wire is first wound into a preselected number of turns and thereafter inserted into slots of the core by wire winding and turn inserting mechanisms of the type disclosed in the aforementioned Mason Patent 2,836,204. Briefly described, a carriage 32 is mounted on a guide 33 which rotates around a stationary coil form 34 driven by a motor mounted below table 18. Lead screws 36 (FIGURE 2) rotate to guide 33 and cause the carriage to travel along the guide. Enameled wire supplied from a spool (not seen) is carried around the coil form to produce the desired number of wound turns in sets 37 (FIGURE 1) which correspond to the number of coils per pole. In the example, the stators have ferromagnetic laminated cores of thirty-six slots adapted to receive four polar coil groups of three concentrically arranged coils spanning four, six and eight teeth respectively. Consequently, three sets of turns having different diameters are wound on form 34.

When the wire has been wound into sets with the desired number of turns, the turns are removed from the form by divider plates (not shown) which travel between pusher blades and place the sets of turns 37 into openings in an injection head 38 adapted at right angles to the axis of form 34 for inserting the turns into selected slots of core 13 as the core is held by a pair of stationary half ring members 41. (Protuberance 16b on holder 16 is used to properly locate core 13 on the conveyor so that it will automatically be placed in rings 41 when the conveyor is swung from station A to station B.) A gear motor operates head 38, timed to move the head, having the sets of turns, into the bore of the core. Pusher shoes (not shown) force the turns out of openings in head 34 and inserts them into the core slots.

After one set of turns has been removed from form 34, wire commences to be wound on the form in an opposite direction to form another set, reversely wound from the first set. A second motor arranged adjacent the first motor and connected to drive carriage 32 in a reverse direction may be used for this purpose. In this way, adjacent polar groups of coils may be furnished having alternating polarity without a break in the wire between groups. This procedure is followed until all four coil groups have been installed into the core, further details of the winding and inserting components to accomplish this operation being described and illustrated more fully in the Mason patent.

It should be noted at this time that in the illustrated exemplification, that holder 16 is attached at one end to arm 26 through a standard index device 42 which functions intermittently in response to compressed air cylinder 43 for indexing the core and holder 16 one hundred eighty electrical degrees after each installation of a set of turns 37. This is accomplished in the following manner. The end of rod 24 remote from conveyor 17 is connected by link 44 to rod 46 which is in turn attached to move with injection head 38. When head 38, carrying the sets of turns to be inserted, is transported toward the bore of the core, conveyor 17 including holder 16 and index device 42, will also be simultaneously moved in the same direction by virtue of link 44 and rod 28 which is slidably received in sleeve 23. A roller 47, rigidly connected to conveyor 17 near index device 42 and track 48 mounted to table 18, offers support for the conveyor during this movement.

As holder 16 leaves the bore of the core and the conveyor assumes the position shown in phantom in FIGURE 1, injector head 38 enters the bore and inserts turns 37 into the selected slots of the core. Thereafter, the injector head and conveyor are returned to the solid line position of FIGURE 1, with holder 16 once again received in the bore of the core. At this time, while the next set of turns are being wound and without a break in the wire between sets, that is, without need for an interpole connection in the wire, the index device 42 is operated by cylinder 43. The device revolves holder 16 and core 13 having one set of turns through the desired angle; e.g., 180 electrical degrees, so that selected slots will be properly located to receive the next set of turns from injection head 38. This procedure is repeated until all sets have been installed, four in the illustrated example, located 90 mechanical degrees apart.

Once the proper number of sets of coils 37a have been placed in core 13, the rack is actuated toward the left in FIGURE 1, as by a conventional timer device (not shown) which effects operation of cylinder 31, and rod 24 is turned clockwise. This in turn will revolve conveyor 17 until holder 16, carrying the core 13 having coils, is returned to the core-transferring station A, with holder 16 being seated on curved edge 21 of upright bracket 19.

As best seen in FIGURE 3, core 13 having coils 37a is then transported to a coil-placing station C, located on table 18 adjacent core-transferring station A. At station C, the core and coils are disposed within a protective enclosure 51 and electrically linked to a suitable pulsing circuit or electrical energy surge source 52, housed beneath table 18 or in a separate cabinet, for generating one or more energy surges in the coils. The surges create electromagnetic forces which act on the coil turns and effect the desired placement of the turns relative to the core.

For transferring core 13 having coils 37a from holder 16 at station A to station C is a carrier, generally indicated at 53, which is supported to move linearly at right angles to conveyor 17, between an extended position in abutment with holder 16 at station A and a retracted position inside the confines of enclosure 51. The axis of the carrier is aligned to the axis of holder 16 when the holder is cradled in bracket 19 at the core-transferring station. In the exemplification, the carrier has a core holder having an outer core insulating sleeve 54 fabricated from suitable hardened insulation material, such as compressed fiber board or "Textolite," (registered trademark of the General Electric Company). The circumferential contour of the sleeve complements the shape of the bore of core 13, with the sleeve surrounding a rigid body 55, attached to a central shaft 56 which extends entirely through the body. The holder is connected at its end remote from station A to enlarged end 57 of driving rod 58 by way of an electrical isolation mounting plate 59.

In particular, a number of bolts 61 extend entirely through body 55 and into a metal threaded socket 62 of plate 59. In addition, a screw 63, having a head recessed in plate 59 from cavity 64, is threaded into an end of the shaft. End 57 fits into cavity 64, being connected to plate 59 by screws 66. This construction firmly attaches body 55, through isolation plate 59, to rod 58 so that they move together as an integrated unit and prevents relative rotation between the parts. Moreover, plate 59 electrically isolates body 55 from metal rod 58 to insure that no stray electrical charges will be transmitted to rod 58.

In order to support the carrier for linear motion between the extended and retracted positions, a wall 67 of enclosure 51, remote from station A, mounts a sleeve type bearing 68 for slidably accommodating rod 58 at one location and an upright bearing and post assembly 68, secured to table 19, slidably supports the rod at a second location spaced from wall 67. Guide pins 69 in wall 67 cooperate with suitable holes in plate 59 to assist in guiding the carrier into the retracted position of FIGURE 4. The carrier is biased toward the retracted position shown in FIGURE 4 by a coil spring 72, connected between post 68 and linkage 71, extending from table 18 to rod 58. Any convenient actuator may be employed to shift the carrier, such as handle 73, secured to rod 58 in the vicinity of linkage 71 and adapted for manual operation.

To facilitate the transfer of core 13 from holder 16 to carrier 53, to aid in maintaining the coil turns in the slots of the core, and to permit replacement of sleeve 54 if such occasion should ever arise, an end cap 74 (see FIGURE 3) is detachably secured by screw 75 to shaft 56 on the end facing holder 16. This cap, preferably formed of insulating material, has an annular recess on its leading edge constructed to fit into the free end of holder 16. Consequently, with the cover or hood of enclosure 51 removed or pivoted to provide access to station C, carrier 53 may readily be moved into mating engagement with the free end of holder 16 and the core having coils slid onto sleeve 54 by the machine operator. A semicircular insulator 76, fastened to the sleeve adjacent plate 59, is adapted to contact the coil end turns for limiting the axial travel of the core having coils on the carrier.

As the carrier 53 is being returned to the retracted position shown in FIGURE 4, the core is angularly aligned relative to the carrier, as by an angularly adjustable stand 77 mounted within enclosure 51. The stand has a flat platform for engaging the outer surface of core 13 having coils to prevent its angular movement relative to carrier 53. Once the carrier has assumed the retracted position of FIGURE 4, the core and coils are electrically coupled across terminals of pulsing circuit 52, and the hood of enclosure 51 closed and latched, as indicated at 79 in FIGURE 5.

Although any suitable means may be used to generate the electrical energy surge in coils 37a to effect the desired placement of the coils relative to the core, FIGURES 3, 4 and 5 show an inductive coupling fixture having a primary winding 81 as the holder for carrier 53, of the type disclosed and claimed in my copending application Ser. No. 568,587, filed July 28, 1966, and a pulsing circuit 52 such as that disclosed and claimed in the copending application Ser. No. 568,585, filed July 28, 1966 of William Baldwin, both assigned to the same assignee of the present invention. Since the details of the fixture and circuit are fully described in the two applications, I will not set them out here. Suffice it to say that winding 81 is carried by laminated body 54, the winding producing magnetic poles which simulate the poles of core 13 formed by coils 37a. Terminal leads 82, 83 of winding 81 are connected across terminals 84, 85 of pulsing circuit 52. The ends 86, 87 of coils 37a are clamped in suitable electrical connectors 88, 89 which have at least one movable, serrated jaw for cutting through the enamel coating of the wire to provide a good electrical contact with the wire. The connectors revealed in the U.S. application Ser. No. 566,516 of William C. Smotherman filed July 20, 1966 are representative of the type which may be satisfactorily employed for this purpose in enclosure 51. The connectors are in turn in circuit with terminals 84, 91 through conductors 92, 93.

To effect the desired coil-placement operation, switch 94 is closed. Storage capacitors are charged to a first voltage level as regulated by control 95 and subsequently discharged into winding 81 as the circuit provides a closed electrical path through coils 37a. The surge of current flowing through winding 81 induces current flow in coils 37a and establishes a transient magnetic field. The current flow and varying magnetic field create electromagnetic forces which act on the coils, both in the slots and at the end turns, to force them back. Thereafter, the pulsing circuit sequentially supplies a second level of energy to the coils 37a as regulated by control 96 while simultaneously short circuiting winding 81 to produce an interaction of the coils and winding thereby effecting the desired position of the coils relative to the core (FIGURE 5). During this operation, relative rotation between body 54 of carrier 53 and the core is prevented by stand 77 in the manner already described for rigidly supporting body 55.

In view of this automatic sequencing action, the desired press back (including connection of coil ends 86, 87 to connectors 88, 89) may be achieved in the neighborhood of twenty-five seconds, which is less time than that required for distributing turns in the core slots at station B for many situations, especially where four or more sets of coils are being installed. Thus, it is desirable for the operator to place a core 13a (FIGURE 4) onto holder 16 of the conveyor at core-transferring station A and to initiate the transfer of the core to station B for the coil-distributing function by depressing switch button 97 before the necessary connections of coils 37a in station C are made. Switch button 97 energizes a standard circuit (not shown) for actuating conveyor 17 to effect transfer of the core to station B and for operating the winding and inserting turn mechanisms in the manner already outlined.

Should an electrical failure occur in the coils being placed into the desired position in station C, the surge might produce sparks and cause a sudden expansion of air within the confines of enclosure 51. Consequently, the enclosure should be sufficiently perforate to compensate for this sudden expansion of air and allow the air to escape from the confines of the enclosure. However, in that rare event where a failure in the coils does occur, the enclosure 51 will adequately protect the machine operator from incurring any potential injury.

After the coil placement has been effected at station C, the hood of enclosure 51 is unlatched and opened. The core having coils is then removed from carrier 53 by merely sliding the core having coils off the end of the carrier, in the direction of station A. This prepares station C for the accommodation of the next core having coils, core 13a.

FIGURE 6 reveals another way in which coils 37a may be electrically linked to an energy surge source 52a for generating at least an energy surge in the coils to effect their placement relative to the core. For ease in description, like parts used in connection with FIGURES 3, 4, and 5 are identified by like reference characters. The carrier 53a is essentially that described above, differentiating therefrom principally in regard to body 55a which is a solid cylinder of non-magnetic or non-ferrous, electrically conductive material. End cap 74 is attached directly to one end of the cylinder as is plate 59 on the other end. In addition, coils are connected in circuit with energy surge source 52a such that a surge of current is generated in the coils from source 52a in the manner more fully disclosed in the U.S. Patent No. 3,333,328 granted Aug. 1, 1967 to Raymond G. Rushing, assigned to the same assignee as the present invention.

From the foregoing descripiton of the improved apparatus exemplifying the invention, it will be appreciated that the various operations for developing coils in cores can be efficiently and safely carried out by a single operator on inductive devices such as the stator cores of small and fractional horsepower electric motors and other coil accommodating members. The coil developing operations can advantageously be accomplished by an integrated and economical apparatus without the necessity for completely reconstructing winding machines now in use to provide the turn-distributing function of the apparatus.

While only certain preferred features of my invention have been shown herein, it will be appreciated that changes and modifications may be made by those skilled in the art without departing from the true scope and spirit of my invention. It is therefore to be understood that the appended claims are intended to cover all equivalent variations as fall within the invention.

What I claim as new and desire to secure by Letters Patent of the United States is:

1. Apparatus for developing a plurality of wound electrical coils formed from a number of conductor turns in core receiving slots of a stator core having a bore extending axially through the core, the apparatus comprising: a core-transferring station, means mounted in spaced relation to the core-transferring station for distributing conductor turns in slots of the stator core; conveying means including a holder adapted to be received in the bore of the core for transporting the core between the core-transferring station and the turn-distributing means; and coil-placement means for effecting the desired placement of the coils relative to the core mounted in spaced relation to the core-transferring station; said coil-placement means including a carrier having a holder for entering the bore of a stator core having coils in the slots thereof to support the core, and an electrical coupler for linking the stator core and coils to an electrical energy surge source for generating one or more energy surges in the coils carried by the core to create electromagnetic forces which act on the coils and produce the desired coil placement thereof relative to the stator core.

2. The apparatus set forth in claim 1 in which the electrical coupler of the coil-placement means includes an electrical winding mounted in the holder of said carrier and said carrier is mounted for movement toward and away from the core-transferring station.

3. The apparatus set forth in claim 2 in which the coil-placement means includes a perforate enclosure surrounding the core having coils, the holder of said carrier, and said electrical coupler to protect an operator from possible electrical hazards when energy surges are being generated in the coils.

4. The apparatus set forth in claim 1 in which the holder of said conveying means faces toward the coil-placement means when said conveying means is disposed at said transferring station, said carrier holder being mounted for movement into an extended position located at said core-transferring station, said holders being in aligned adjacent relation when said carrier is in the extended position to facilitate transfer of the core having coils from one holder onto the other holder.

5. The apparatus set forth in claim 1 in which the means for distributing conductor turns in slots of the stator core includes a coil turn winding form, a coil inserter for receiving the wound turns from the form and inserting them into the core slots, and said holder of the conveying means is mounted for movement into the bore of the one core as said coil inserter enters the bore to insert the wound turns into the core; and during the distribution of the turns in the one core, said electric coupler and the electrical energy surge source generate at least one energy surge in at least one coil of another core being held by the carrier of said coil-placement means.

6. Apparatus for developing wound electrical coils formed from a number of conductor turns, in coil receiving slots of a magnetic core comprising, conveying means for transporting the core between a core-transferring station and a coil turn-distributing means for disposing the turns in the slots of the core to form at least one coil; and means mounted adjacent to the core-transferring station for effecting the desired placement of the coils relative to the core; the coil placement means including a carrier for holding the core having coils in the slots thereof, and an electrical coupler for linking the at least one coil and core to an electrical energy surge source to thereby generate at least one energy surge in the at least one coil and produce electromagnetic forces acting upon the coil for effecting the desired coil placement thereof relative to the core.

7. The apparatus set forth in claim 6 in which the electric coupler includes an electrical winding mounted in the carrier and connected in circuit with the electrical energy surge source and detachable connector jaws for making an electrical connection with the coils in the core 8. The apparatus set forth in claim 6 in which the coil placement means includes a device for establishing a predetermined angular relationship with respect to the carrier and for maintaining the relationship as the at least one energy surge is being generated in the coils of the core.

9. The apparatus set forth in claim 6 in which the carrier of the coil placement means is mounted for movement between the core-transferring station and the coil placement means to transport the core having coils in the slots thereof, away from the conveying means at the core-transferring station.

10. The apparatus set forth in claim 9 in which said carrier has an extended position in the vicinity of the core transferring station and means is mounted at the core transferring station for positioning the conveying means in alignment with said carrier when in its extended position to facilitate transfer of the core having coils from said conveying means to said carrier.

11. The apparatus set forth in claim 6 in which the conveying means includes an indexer actuable at the coil turn-distributing station for periodically turning the core when the core is positioned at the supporting means to expose different slots for receiving coil turns therein.

12. The apparatus set forth in claim 6 in which the core positioning means supports one core, with the conveying means being disposed at the coil turn-distributing station as the turns are being distributed in the core slots; and said electric coupler, together with the electrical energy surge source, concurrently generate at least one energy surge in at least one coil of another core being held by the carrier of said coil placement means.

References Cited

UNITED STATES PATENTS

| | | | |
|---|---|---|---|
| 3,333,327 | 8/1967 | Larsen | 29—596 |
| 3,333,328 | 8/1967 | Rushing | 29—596 |
| 3,333,329 | 8/1967 | Linkous | 29—596 |
| 3,333,330 | 8/1967 | Linkous | 29—596 |
| 3,333,335 | 8/1967 | Sims | 29—596 X |
| 3,348,183 | 10/1967 | Hodges et al. | |
| 3,353,251 | 11/1967 | Linkous | 29—205 |

JOHN F. CAMPBELL, *Primary Examiner.*

J. L. CLINE, *Assistant Examiner.*